Jan. 10, 1961   H. BRETTHAUER   2,967,468
PHOTOGRAPHIC SHUTTER AND DIAPHRAGM ADJUSTING MECHANISM
Filed Feb. 5, 1959   2 Sheets-Sheet 2

United States Patent Office 2,967,468
Patented Jan. 10, 1961

2,967,468

PHOTOGRAPHIC SHUTTER AND DIAPHRAGM ADJUSTING MECHANISM

Hermann Bretthauer, Stockheim, near Braunschweig, Germany, assignor to Franke & Heidecke, Fabrik Photographischer Prazisions-Apparate, Braunschweig, Germany, a firm of Germany Filed Feb. 5, 1959, Ser. No. 791,355

Claims priority, application Germany Feb. 8, 1958

12 Claims. (Cl. 95—10)

The present invention relates to photographic cameras having a built-in exposure meter and to a shutter and diaphragm adjusting mechanism for semi-automatically setting exposure values in accordance with the indications of the exposure meter and, more particularly, to such a camera having mirror reflex focusing and view finding chambers such as, but not limited to, the twin lens reflex camera currently available on the market under the trademark "Rolleiflex."

An object of the invention is to provide a new and improved shutter and diaphragm adjusting mechanism for the setting of exposure values including a differential arrangement operatively coupled to an exposure value meter, the mechanism being designed for use in a camera of the type having a focusing and view finding chamber and an exposure chamber disposed one above the other.

Another object is the provision in a camera having a built-in exposure meter of a shutter and diaphragm adjusting mechanism operatively connected to a follow-up pointer on the exposure meter by a lever differential mechanism for the setting of exposure values.

Yet another object of the invention is to provide in a camera having shutter blade and diaphragm aperture adjusting members carried by a movable objective support and a built-in photoelectric exposure meter carried by the stationary camera body, a connecting mechanism between the adjusting members and exposure meter for setting exposure values in a complementary manner, that is, by adjustment of the members while keeping the same exposure value, or in a non-complementary manner, that is, by adjustment of one of the members to a particular shutter speed or diaphragm aperture, the other member being automatically adjusted to the proper value for an indicated exposure value.

Still another object is the provision of a shutter speed and diaphragm aperture adjusting mechanism as previously described which is convenient to set and inexpensive to manufacture while fitting within available space within a twin lens reflex camera.

A further object is to provide an exposure value setting mechanism as previously described arranged to accommodate two or more ranges of sensitivity of the exposure value meter.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
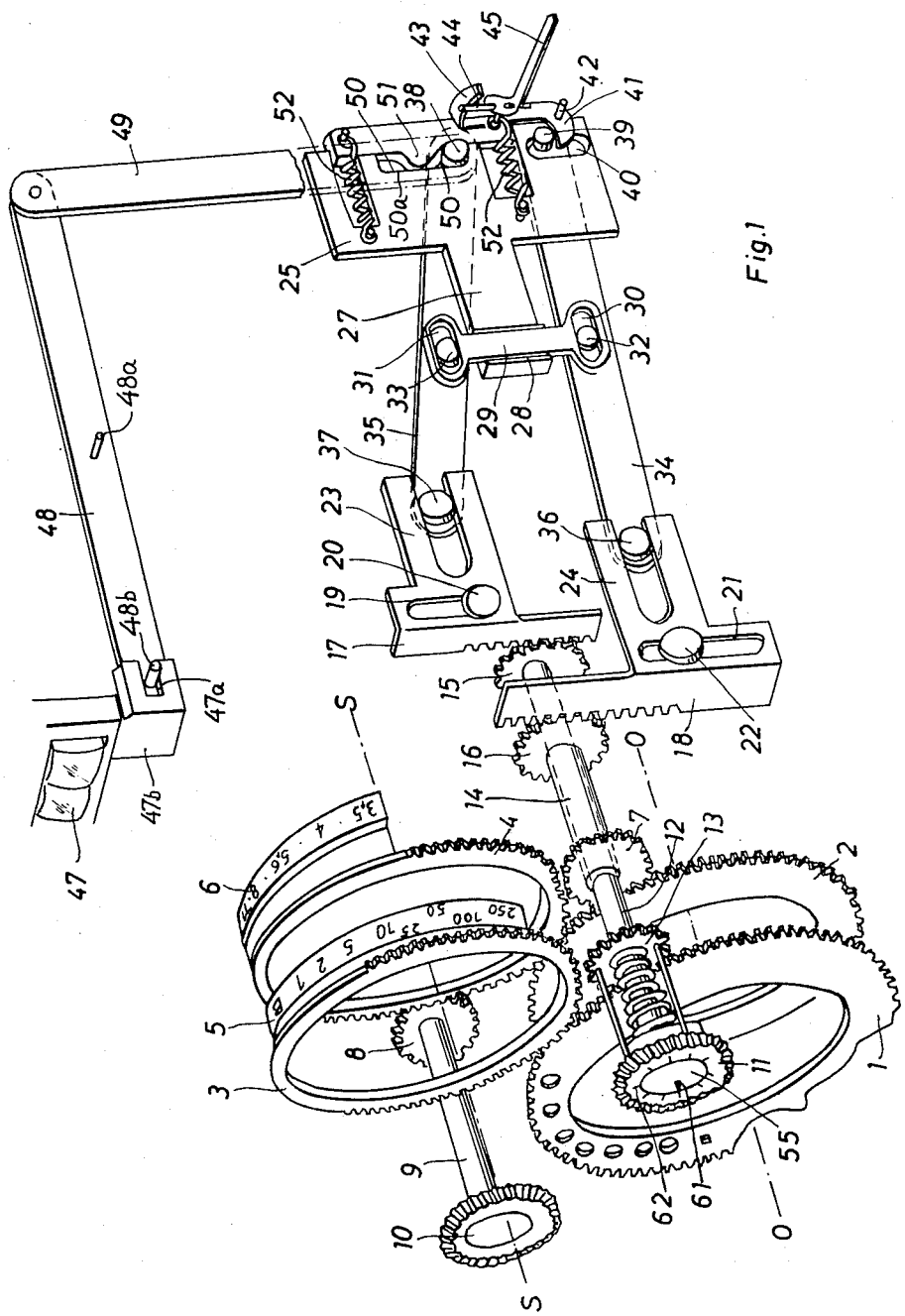
Fig. 1 is a skeletionized or diagrammatic perspective view of the adjusting mechanism in accordance with the present invention, with conventional parts of the camera construction omitted for the sake of clarity.

As already indicated, the present invention is intended especially for use with a photographic camera having a mirror reflex focusing and view finding chamber, the problems in connection with adjustment of shutter speed and diaphragm aperture in such cameras being somewhat different than with other types of cameras. The operator customarily holds a camera of this kind at chest level or waist level, and looks downwardly toward the viewing screen of the focusing and view finding chamber when preparing to take the picture. In certain types of such cameras, the adjusting scales for the shutter speed and the diaphragm aperture or stop are visible through an observation window which faces upwardly near the front of the camera, so that the operator can see the indications visible through this window while looking downwardly toward the focusing screen, and the shutter speed and diaphragm adjustments are also made by finger operated knobs accessible at the front of the camera. Hence one of the problems encountered in devising new adjusting mechanism for simultaneously adjusting the aperture and the shutter speed in a complementary manner, and also for adjusting them in a non-complementary manner, both furthermore in accordance with the indications of a built-in exposure value meter, is to make the new adjusting mechanism in such form that at least the speed and aperture adjusting scales or indications will still be visible through an observation window located approximately in the same position as formerly, and so that the adjustments may still be accomplished by finger manipulation of adjusting knobs located in approximately the same position as formerly, in order that the operator, when using the new mechanism, may follow approximately the same pattern of convenient and easy operation to which he has already become accustomed in operating previous forms or models of cameras of the same general type.

While the present invention may be applied to various forms of twin lens reflex cameras, it is here disclosed by way of example as applied to a twin lens reflex camera of the kind identified by the trademark "Rolleiflex" manufactured by the firm of Franke & Heidecke, of Braunschweig, Germany, and widely known and used throughout the United States. Different models of this well known camera have varied in details from time to time, but the basic construction, at least of those parts with which the present invention is concerned, has remained essentially the same for several years past. The following disclosure of the invention presupposes familiarity with the main constructional features of the "Rolleiflex" camera. For those not already familiar with the construction of this camera, reference may be made to the book "Rollei Photography, Handbook of the Rolleiflex and Rolleicord Cameras," by Jacob Deschin, published in 1952, by Camera Craft Publishing Company, of San Francisco, California.

As will be readily understood by those familiar with the "Rolleiflex" camera, this camera comprises two lenses, a lower or picture-taking lens with which a shutter is associated, and an upper or finder lens having no shutter. The shutter may be of any convenient form, such as the shutter marketed under the trademark "Compur," manufactured for many years by the firm of Friedrich Deckel, of Munich, Germany. The principal features of such a shutter are disclosed in United States Patent 1,687,123, granted October 9, 1928, for an invention of Deckel and Geiger. Thus shutter has, as usual, an adjustable iris diaphragm or stop adjusted by movement of the built-in adjusting member in a direction circumferentially or peripherally of the shutter casing, the diaphragm preferably being mounted by some conventional practice in such a way that equal angular movements of the adjusting member will produce equal proportionate changes in the aperture area. This may be accomplished, for example, as taught in U.S. Patent 871,654, granted November 19, 1907, on an application of Watkins and Woodhead, or in British Patent 464,892, accepted April 27, 1937, on an application of Zeiss Ikon A.G. The timing adjustment or speed adjustment of the shutter (controlled by the speed adjusting ring 63 in said Deckel and Geiger patent) is also preferably constructed in such manner by properly constructing the shape of the control cam on this ring 63 so that equal angular movement of the speed adjusting ring will produce equal proportionate changes in the time of duration of exposure.

Portions of the shutter and diaphragm adjusting mechanism of the present invention are similar to the constructions shown and described in the copending applications of Hermann Bretthauer and Hermann Friedrich Albrecht, Serial No. 404,522, filed on January 18, 1954 (now Patent 2,912,913, granted November 17, 1959), and of Richard Weiss, Serial No. 462,073, filed on October 13, 1954 (now Patent 2,912,914, granted November 17, 1959. The disclosures of said copending United States applications (by co-workers of the present applicant) and the disclosures of the partly corresponding British Patent 756,693 and French Patent 1,094,681 and Italian Patent 512,858 are incorporated herein by reference. It will be assumed in the following description that the reader is already familiar with such disclosures.

With reference to Fig. 1, wherein the conventional parts of the camera construction have been omitted for the sake of clarity, the optical axis of the picture-taking lens and of its associated shutter is indicated by the broken line O—O, while the optical axis of the finder lens, located above and parallel to the optical axis of the picture-taking lens, is indicated by the broken line S—S. The lenses themselves, as well as the shutter and the camera body, are omitted from Fig. 1, it being understood that the two lenses and the shutter are carried by the camera front wall which is movable forwardly and backwardly (longitudinally of the two optical axes S—S and O—O) for purposes of focusing, by means of the usual focusing knob on the camera body.

Mounted on the camera front structure, not here shown, and extending outwardly therefrom in positions accessible for operation by the fingers of the operator, are two adjusting knobs 10 and 11, shaped similarly to and occupying the same positions as the customary adjusting knobs already familiar in "Rolleiflex" cameras. However, in the "Rolleiflex" cameras as heretofore constructed, the left hand knob occupying the position of the knob 11 in the present drawings, serves to control the stop or diaphragm aperture, while the right hand knob occupying the position of knob 10 in the present drawings, serves to control the shutter speed. (The terms "right" and "left" as here used, refer to the respective right and left side of the camera as normally held in front of the chest or waist of the operator, with the lenses pointing forwardly. Hence these terms are reversed with reference to the appearance in Fig. 1 of the drawings, which views the camera obliquely from the front.) In the present instance, however, the knobs 10 and 11, although of the same general shape and in the same locations as the speed and diaphragm adjusting knobs in the conventional "Rolleiflex" camera, serve different functions, as explained hereinafter.

The auxiliary shutter speed adjusting ring 1 and the auxiliary diaphragm aperture adjusting ring 2 both rotate on the shutter casing about the optical axis O—O as a center of rotation, and the ring 1 is coupled in the usual manner to the built-in speed setting or time setting ring of the shutter (such as the ring 63 in the above noted Deckel and Geiger patent) while the diaphragm ring 2 is likewise coupled in the usual manner to the aperture adjusting member of the shutter (shown but not specifically described or numbered in said Deckel and Geiger patent). The speed adjusting member 1 is provided with peripheral gear teeth which engage with peripheral gear teeth on a drum or ring 3 which rotates about the upper lens axis S—S as a center, and which has a flange provided with a graduated scale 5 marked with the various shutter speeds. The diaphragm adjusting ring 2 is also provided with peripheral gear teeth which mesh with peripheral gear teeth on a drum or ring 4. The ring 4, like the ring 3, rotates about the upper optical axis S—S as a center. This ring 4 has a flange provided with graduations or markings 6 showing the value of the aperture or stop for which the shutter diaphragm is set at any particular time, the scale 6 usually being graduated in terms of f number. The shutter speed graduations 5 and the diaphragm scale graduations 6 are both visible, when looking downwardly from above, through a sight window not here shown, although corresponding in location to the speed and aperture sight window shown unnumbered in Fig. 5 of the copending application of Hermann Bretthauer, Joachim Mädge, and Wolf Kroeger, Serial No. 657,552, filed on May 7, 1957 (now Patent No. 2,926,562) beneficially owned by the beneficial owner of the present application), or in Fig. 1 of each of the copending U.S. patent applications of applicant's co-worker Karl Rander, Serial No. 633,881, filed January 14, 1957 (now Patent 2,909,108 granted October 20, 1959), and Serial No. 641,727, filed February 21, 1957 (now Patent No. 2,937,568) (beneficially owned by the beneficial owner of the present application).

The rings 1, 2, 3, and 4, together with the scales 5 and 6 and the sight window not here shown, are substantially the same as in the "Rolleiflex" cameras already in use, and perform the same functions of adjusting and indicating the adjustment of the shutter speed and the diaphragm aperture, so they need not be further described.

In the present construction, the finger knob 10 is fixed to the front end of a shaft 9 which is journaled in suitable stationary bearings supported from the camera front, and which carries an intermediate pinion 8 fixed to the end of the shaft 9 and in meshing engagement with the peripheral teeth on the ring 4. By turning the knob 10 by finger pressure, the ring 4 may be turned through the pinion 8 to vary the stop or diaphragm aperture through its engagement with the adjusting ring 2. The pinion 8, in turning the ring 4, brings the appropriate part of the scale 6 beneath the observation window, to show the operator the particular diaphragm aperture which has been set.

The other finger knob 11 is adjustably coupled to the front end of shaft 12 by a clutch device to be described in greater detail hereafter. The shaft 12 has a pinion 13 fixed to it and meshing with the peripheral teeth on the shutter adjusting ring 1. Rotation of the knob 11 by finger pressure causes the pinion 13 to turn the ring 3 until the desired shutter speed setting is visible through the observation window while at the same time rotating the ring 1 to vary the shutter speed.

The camera in accordance with the present construction is provided with a built-in exposure value meter, that is to say, the type which is permanently associated with the camera, or the type which is provided as a removable optional accessory. The exposure value meter is mounted on the lower portion of the left side wall of the camera body, as, for instance, is illustrated in Fig. 5 of the aforementioned copending patent application Serial No. 657,552. Preferably the exposure value meter is of the moving coil galvanometric type indicated at 46 in Fig. 4 and having a moving coil to which is connected a pointer 46a. The meter 46 is actuated in accordance with the output of a photoelectric cell 47 as shown in Fig. 1, the cell 47 preferably being mounted at the upper front portion of the stationary camera body and being preferably substantially similar to the device described in the aforementioned patent application Serial No. 657,552.

Figure 4:
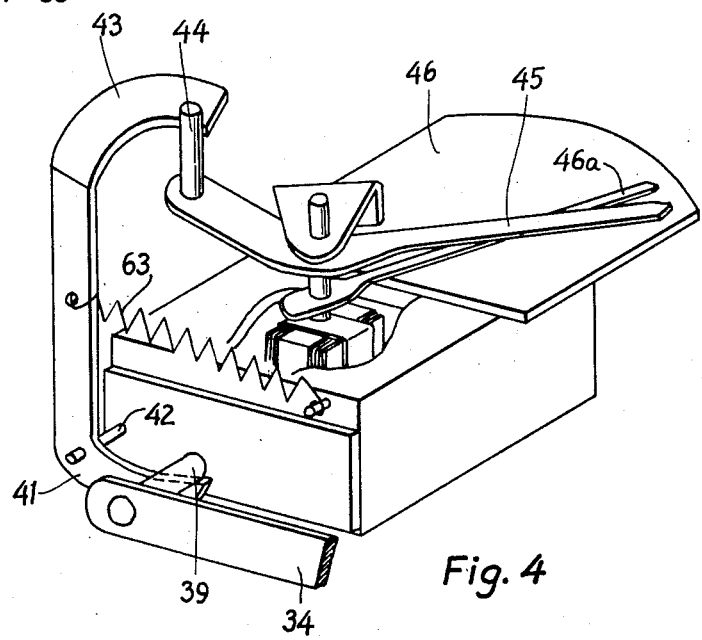
Fig. 4 is an enlarged view of a portion of the mechanism shown in Fig. 1 and further including a perspective view of an exposure value meter.

Further in accordance with the present invention, the shutter speed adjusting ring 1 and the diaphragm adjusting ring 2 and the respective adjusting knobs 11 and 10 associated therewith are operatively connected to a lever differential arrangement for the setting of exposure values on the camera in accordance with the indications of the pointer 46a of the exposure value meter 46. Preferably a follow-up pointer 45, shown in Figs. 1 and 4, is provided to be alined with the meter pointer 46a. The differential arrangement is such that the camera may be set regardless as to the absolute values of the shutter speed or diaphragm aperture, or that a particular shutter speed may be selected and the diaphragm aperture automatically adjusted to give the proper exposure value, or that the diaphragm aperture may be selected and the shutter speed automatically set in accordance with the proper exposure value. Preferably the photoelectric cell 47 has two ranges, and the differential arrangement is adapted to operate in either of the ranges.

The shaft 12 interconnecting the adjusting knob 11 and the gear 13 is preferably extended rearwardly to extend into the stationary camera body and is provided at its end with a gear 15, the gear 15 being fixed to the shaft 12 and having the same rotational movement as the gear 13. Meshing with the gear 15 is a vertically extending rack 17 suitably mounted on the stationary camera body for vertical up and down movement in response to angular movements of the gear 15. Conveniently, the rack 17 has a rearwardly extending flange provided with a vertically extending slot 19 interengaged with a pin 20 carried by the stationary camera body. In using the term "vertical" it is assumed that the camera is held in an up and down position, and more generally the rack 17 and slot 19 extend in a direction perpendicular to the optical axis of the camera. The rearwardly extending flange of the rack 17 is developed as a fork 23 defining an open ended slot having upper and lower edges which extend parallel to the optical axis and to the movement of the objective support.

The diaphragm adjusting ring 2 is interconnected with a rack 18 similar to the rack 17. To this end, a small gear 7 is in mesh with the peripheral gear teeth on the ring 2 and is fixed to a hollow shaft 14 at the other end of which is secured a gear 16 in mesh with the vertically extending rack teeth on the rack 18. To provide a space saving arrangement and in order to simplify the structure, the hollow shaft 14 is concentric with the shaft 12, that is, the shaft 12 extends through the shaft 14. That part of the shafts 12 and 14 disposed between the gears 7 and 16 are constructed in any suitable manner as telescopic shafts so that they transmit the rotation, but permit an alteration in their length. This is necessary as the gears 7 and 13 are mounted on the objective support, which is movable along the optical axis for focusing purposes, whereas the gears 15 and 16 are mounted on the main camera housing and mesh with the racks 17 and 18.

The rack 18, like the rack 17, is mounted for limited movement perpendicular to the optical axis of the camera, for which purpose the rearwardly extending flange on the rack 18 is provided with a vertically extending slot 21 in engagement with a pin 22 carried by the main camera body. The rearwardly extending flange of the rack 18 is developed as a fork 24 similar to the fork 23 and having a central slot having upper and lower edges parallel to the optical axis. With this arrangement, it can be seen that adjusting movement of the knob 10 rotates the rings 4 and 2, as a result of which the small gear 7 is rotated, its rotation being transmitted to the gear 16 through the hollow shaft 14 to move the rack 18 upwardly and downwardly by a corresponding amount perpendicular to the optical axis. In similar fashion, rotation of the knob 11 is transmitted through the shaft 12 to the gears 13 and 15, and there is a corresponding upward and downward movement of the rack 17 perpendicular to the optical axis.

To transmit and relate movement of the racks 17 and 18 to that of the follow-up pointer 45, a plate 25 is fixed relative to the side wall of the main camera housing and has a forwardly projecting arm 27 at the end of which is arranged a guideway 28 extending substantially perpendicular to the optical axis. Mounted within the guideway 28 for limited sliding vertical movement is a coupling member 29. The guideway 28 is thus parallel to the slots 19 and 21 and is perpendicular to the rearwardly extending slots in the forks 23 and 24. The coupling member 29 has oval eyes 30 and 31 at either end, each of the eyes defining a slot parallel to the slots in the forks 23 and 24.

A pair of double-armed levers 34 and 35 are provided each having centrally located pivot studs 32 and 33, respectively, mounted for sliding movement in one of the eyes 30 and 31. As shown, the lever 34 is lowermost and has its central stud 32 engaged in the slot in the eye 30 for limiting sliding and pivotal movement. The forward end of the lever 34 is provided with a laterally extending pin 36 slidably and pivotally mounted in the slot in the fork 24 carried by the rack 18. The rearmost end of the lever 34 carries a laterally extending pin 39 movable within a slot 40 in the plate 25 extending perpendicular to the optical axis. The pin 39 engages the rearmost edge of the slot 40 so that the rearward end of the lever 34 is movable substantially parallel to the guideway 28. The upper lever 35 carries the stud 33 which is mounted for limited sliding and pivotal movement within the slot in the eye 31 of the coupling member 29. The forward end of the lever 35 is provided with a laterally extending pin 37 which, similar to the pin 36, is pivotally and slidably engaged in the slot in the fork 23. The rearward end of the lever 35 carries a laterally extending pin 38 which is rotatably mounted in one of two openings 50 provided between the rear edge of the plate 25 and the forward edge of a wedge piece 51. The rear edge of the plate 25 is provided with a centrally located recess 50a and the wedge piece 51 has a centrally located rounded projection for dividing the recess 50a into the approximately equal upper and lower openings 50. The wedge piece 51 is spring mounted on the plate 25 in order that it may be retracted for permitting the pin 38 to move from one opening 50 to the other opening 50 for a purpose to be explained in more detail hereafter. Thus, upper and lower springs 52 are provided extending between the plate 25 and the wedge piece 51 so that the pin 38 is securely held for rotation in one of the openings 50 while yet being displaceable to allow the pin 38 to move from one opening to the other.

Changes in location of the pin 39 carried by the lower lever 34 are arranged to produce a corresponding pivoting movement of the follow-up pointer 45 so that it may be alined with the pointer 46a of the exposure value meter 46. To this end, see Fig. 4 and also Fig. 1, a feeler bellcrank lever 41 is pivoted on a rod 42 carried by the plate 25, the short arm of the bellcrank 41 being curved and underlying the pin 39 in engagement therewith. The long arm of the bellcrank lever 41 has secured to its upper end a laterally extending cam bar 43 arranged so as to be in engagement with a substantially vertical rod 44 carried by the end of the follow-up pointer 45. A spring 63 extends between the long arm of the lever 41 and the housing of the exposure value meter 46 for urging the cam 43 constantly into engagement with the rod 44.

It can be seen by referring to Fig. 1 that a parallelogram is formed by the double-armed levers 34 and 35 and that they are coupled for dependent movement by the cross coupling member 29. The pin 38 is held stationary in one of the openings 50 and the pins 36 and 37 are movable in dependence on the movements of the racks 17 and 18, and the racks 17 and 18, as has been explained, are movable in dependence on the movements of the shutter adjusting ring 1 and the diaphragm adjusting ring 2 and the adjusting knobs 11 and 10, respectively coupled therewith. The pin 39 is movable within the slot 40 in dependence on the position of the pins 36 and 37 with relation to the stationary pin 38. The position of the pin 39, as has been explained, regulates the position of the follow-up pointer 45 for the setting of exposure values as indicated by the exposure value meter 46. With suitable subdivision of the scales 5 and 6 in known manner, both shafts 12 and 14 and gears 15 and 16 carry out equal angular movements without relative displacement when the exposure value quotient is maintained, and also also both racks 17 and 18 are displaced by the same amount in the same direction. The result of this is that a straight parallelogrammic movement of the levers 34 and 35 takes place, so that with the pin or stud 38 stationary, the pin 39 is merely rotated in the slot 40, whereby the position of the follow-up pointer 46 is unaffected. However, when the shafts 12 and 14 are not equally rotated or are turned in opposite directions, the pin 39 changes its position in the slot 40 and so causes an adjustment of the follow-up pointer 45 through the lever 41 and the cam 43.

It is desirable to arrange the exposure value adjusting mechanism to accommodate two or more measuring ranges of the exposure value meter 46 which are effective by changing over the photoelectric cell 47 from one sensitivity range to another sensitivity range as, for example, by movement of a diaphragm plate in the manner explained in the aforementioned patent application 657,552. For effecting this change-over, a pair of pivotally interconnected links 48 and 49 are provided, the lower end of the link 49 being pivoted to the inner end of the pin 38. The upper end of the link 49 is pivoted to the rear end of the lever 48, which is pivoted intermediate its length on the stationary pivot 48a. The front end of the lever 48 carries a laterally projecting pin 48b which engages a slot 47a in a portion 47b of the vertically shiftable mask or slide or diaphragm whose vertical position determines the sensitivity range at which the photocell 47 operates. The pin 48b may extend laterally out through a slot in the side wall of the camera casing, to an accessible position to form a manipulating handle to be moved upwardly or downwardly to change the sensitivity range.

As has been mentioned, the pin 38 is movable between the upper and lower openings 50 by displacing the wedge piece 51 against the force of the springs 52. The spacing of the openings 50 corresponds to the travel of the pin 39 with a movement of the follow-up pointer from one end of the measuring range to the other. Thus, for example, if the pin 38 is brought from the position of Fig. 1 into the upper opening 50 by forcing out the wedge 51, this causes an equal upward movement of the pin 39 in the slot 40, whereby the follow-up pointer 45 is brought into its opposite limiting position, which corresponds to the starting point of the second measuring range. It is preferable to provide an overlapping of the measurement ranges, that is, the adjustability of the pin 38 does not correspond to the full deflection of the follow-up pointer 45. The travel of the pin 38 from one opening 50 to the other also corresponds simultaneously to the necessary changeover travel of the range-changing photoelectric cell mask or diaphragm, which is operatively connected to the pin 38 by the transmission train consisting of the links 48 and 49. The photocell range-changing slide or diaphragm (not shown) moved by the link 48 may correspond, for example, to the diaphragm or mask 4 in said application 657,552 and to the mask or slide member 82 in said application 641,727.

Figure 2:
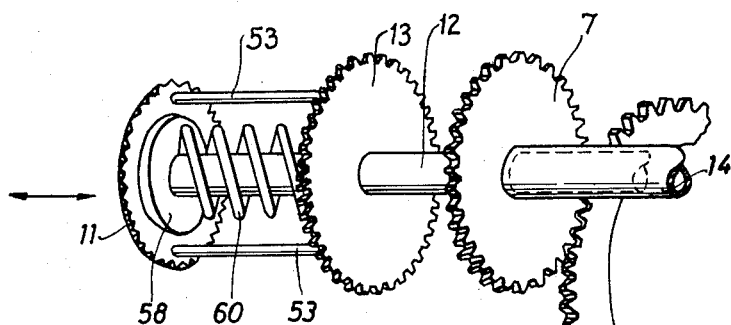
Fig. 2 is a detail perspective view of one of the setting knobs and connecting shaft parts shown in Fig. 1.
Figure 3:
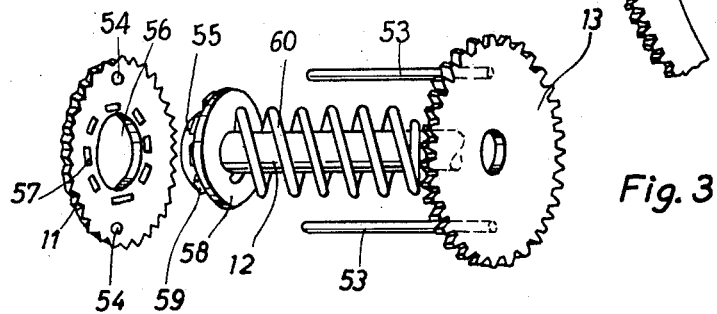
Fig. 3 is an exploded perspective view of the parts shown in Fig. 2.

In order to allow for further adjustment values, such as film sensitivity or filter factor or the like, the setting knob 11 is connected to the shaft 12 by the previously mentioned clutch, while its connection to the gear wheel 13 is rigid. As shown in the preferred embodiment, a film sensitivity adjustment is provided, and is best shown in Figs. 1, 2, and 3. The rigid connection of the knob 11 to the gear 13 is provided by at least two rods 53 secured to the face of the gear wheel 13 and engaging in bores 54 in the setting knob 11. Connected to the front end of the shaft 12 in any suitable manner so as to be non-rotatable but axially displaceable is a knob 55 which fits into a concentric opening 56 of the knob 11. The inside of the knob 11 is formed with openings 57, and a flange 58 of the knob 55 is formed with projections 59 which fit together and are held in engagement by a compression spring 60 acting between the gear 13 and the knob 55. The outer end face of the knob 55 carries an index 61 and the knob 11 carries a scale 62, calibrated in degrees of film sensitivity. Of course, if desired, the reverse arrangement may be provided with the scale on the knob 55 and the index 61 on the knob 11. With the knob 11 coupled to the knob 55 by engagement of the projections 59 in the openings 57, rotating the knob 11 also rotates the shaft 12 and also the gear 13. By pushing the knob 55 against the tension of the spring 60 and inwardly relative to the knob 11, the clutch parts 57 and 59 are disengaged so that the knob 11 can be rotated without driving the shaft 12, or conversely the knob 55 can be rotated without driving the gear 13 until the corresponding film sensitivity adjustment is achieved.

To summarize the operation, the proper exposure value meter range is determined and the pin 38 moved into the upper or lower opening 50 according to the range selected. Movement of the pin 38 between the two openings is obtained by deflecting the wedge piece 51 rearwardly against the tension of the spring 52. Displacement of the pin 38 produces a corresponding displacement of the photoelectric cell diaphragm through the links 48 and 49. Thereafter the appropriate film sensitivity is chosen and set on the scale 62 with reference to the pointer 61 by preferably deflecting the inner knob 55 inwardly with one finger while turning the setting knob 11 with the fingers of the other hand. Focusing of the camera may be done in the usual manner while observing the image in the ground glass and adjusting the focusing knob, both not here shown, in the usual manner. The exposure value to be set on the camera may be observed by noting the position of the pointer 46a of the exposure value meter 46 as determined by the amount of light striking the photoelectric cell 47.

The shutter adjusting ring 1 and the diaphragm adjusting ring 2 are set in the proper position for the indicated exposure value by suitable adjustment of the setting knobs 10 and 11 while observing the position of the follow-up pointer 45 with respect to the pointer 46a of the exposure value meter. To aline the pointers 45 and 46a, assuming that no particular shutter speed or diaphragm aperture is desired, either of the setting knobs 10 or 11 may be rotated or else they may be both rotated simultaneously until the alinement of the pointers occurs. Rotation of the diaphragm aperture setting knob 10 rotates the ring 6 through the gear 8 and also simultaneously the ring 2. Rotation of the ring 2 is transmitted to the gear 7 and, through the shaft 14, to the gear 16. Angular movement of the gear 16 causes translatory movement of the rack 18 and corresponding movement of the pin 36 of the double-armed lever 34 approximately perpendicular to the optical axis. Since the pin 38 is stationary while the pins 37 and 39 are free to adjust to their positions as restrained by the interconnected coupling member 29, there is a change in the position of the follow-up pointer 45 as well as a change in angular position of the shutter speed adjusting ring 1 and the scale ring 3 interconnected therewith. The change in the follow-up pointer 45 occurs since the pin 39 is in engagement with the bellcrank lever 41 and rotates the lever 41 to change the position of the cam 43 secured to it. As the pin 44 secured to the follow-up pointer 45 follows the movement of the cam 43, there is a resultant adjustment in position of the follow-up pointer 45. A similar operation of the parts occurs when the shutter speed setting knob 11 is rotated. The exposure value adjusting and setting mechanism operates such that both shafts 12 and 14 and gear wheels 15 and 16 carry out equal angular movements without relative displacement when the exposure value quotient is maintained, and thus both racks 17 and 18 are displaced by the same amount in the same direction. The result of this is that a straight parallelogramic movement of the levers 34 and 35 takes place, so that with the pin 38 stationary, the pin 39 is merely rotated in the slot 40, whereby the position of the follow-up pointer 45 is unaffected. However, if the shafts 12 and 14 are not equally rotated or are turned in opposite directions, the pin 39 changes its position in the slot 40 and so causes an adjustment of the position of the follow-up pointer 45 through the lever 41 and the cam 43.

Should it be desired to set a particular shutter speed on the camera, the knob 11 is rotated until the proper shutter speed appears on the scale 5. Thereafter the diaphragm setting knob 10 is rotated to bring the follow-up pointer 45 into alinement with the exposure value meter pointer 46a. Should it be desired to set a particular diaphragm aperture, the knob 10 is first rotated to set the chosen diaphragm aperture on the scale 6, and thereafter the knob 11 is adjusted to aline the pointers 45 and 46a.

The advantages of the shutter speed and adjusting mechanism according to the present invention for setting exposure values on the camera in accordance with the indications of an exposure value meter are that the lever differential interconnecting mechanism may be arranged laterally at the side of the camera in a space saving arrangement out of conflict with the position of other mechanism already contained within the camera. By reason of the telescopic connection of the shafts 12 and 14 between the gears 7 and 16, part of the mechanism may be mounted on the stationary camera body while the other part may be mounted on the movable objective support which has focusing movement along the optical axis. It permits the use of setting knobs 10 and 11 and ring gears 1, 2, 3, and 4 located in approximately the same place as in previous constructions of the camera, and having generally the same function and method of operation, so that the camera is not radically changed by the addition of new features. The mechanism is arranged to accommodate at least two ranges of sensitivity of the exposure value meter and the photoelectric cell associated with it. The mechanism furthermore takes into account other factors in setting the camera, such as the clutch device for the adjustment of film sensitivity.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera including a built-in photo-electrically operated exposure value meter having a pointer, said camera having a picture-taking lens axis, a shutter speed and a diaphragm aperture adjusting ring each mounted for rotary movement about said lens axis, means including a setting shaft and a knob mounted thereon operatively engaging one of said rings for manual adjustment thereof, a pair of axially extending concentric shafts each coupled to one of said rings, a follow-up pointer arranged to be moved into alinement with said meter pointer, lever differential means coupled to said follow-up pointer for determining the exposure value indicating position thereof, and drive means for operatively connecting said concentric shafts and lever differential means and arranged so that said follow-up pointer indicates a constant exposure value when said concentric shafts are turned an equal angular amount in the same direction and indicates a changed exposure value when said concentric shafts are turned relative to one another.

2. A construction as defined in claim 1, wherein one of said concentric shafts is connected to said setting shaft for rotation therewith.

3. A construction as defined in claim 2, including clutch means between said setting shaft and the knob mounted thereon.

4. A construction as defined in claim 1, wherein said drive means includes a pair of forks extending parallel to said lens axis and mounted for movement at right angles to said lens axis.

5. A construction as defined in claim 3, including at least two gears each secured to one of said concentric shafts for rotation therewith, said drive means further including a rack secured to each of said forks and in meshing engagement with one of said gears.

6. A photographic camera including a built-in photoelectric cell having at least two measuring ranges and an exposure value meter having a pointer, said camera having a picture-taking lens axis, a shutter speed and a diaphragm aperture adjusting ring mounted for rotary movement about said lens axis, means for manually adjusting each of said rings, a pair of axially extending concentric shafts each coupled to one of said rings, a follow-up pointer arranged to be moved into alinement with said meter pointer, lever differential means coupled to said follow-up pointer for determining the exposure value indicating position thereof, and drive means for operatively connecting said concentric shafts and lever differential means and arranged so that said follow-up pointer indicates a constant exposure value when said concentric shafts are turned an equal angular amount in the same direction and indicates a changed exposure value when said concentric shafts are turned relative to one another, said lever differential means including a pair of double-armed levers each having a pivot intermediate its ends, a movable inextensible coupling member for coupling said pivots, one end of each of said levers being connected to said drive means to be rocked thereby, means for coupling the other end of one of said levers to said follow-up pointer, and means for rotatably securing the other end of the other of said levers in at least one of two positions corresponding to the measuring ranges of the photoelectric cell.

7. A construction as defined in claim 6, including means for coupling said other end of said other lever with said photoelectric cell to effect the change-over from one measuring range to the other.

8. A construction as defined in claim 7, wherein said means for coupling the other end of said one of said levers with said follow-up pointer includes a compensating cam.

9. A construction as defined in claim 6, wherein said means coupling the other end of one of said levers to said follow-up pointer includes a first pin engaged in a slot and abuttable with either end thereof, and said means for rotatably securing the other end of the other of said levers includes a second pin movable between two connected openings, and means for connecting said second pin with said photoelectric cell to effect the change-over from one measuring range to the other, said second pin automatically moving from one of said openings to the other when said first pin abuts an end of its slot during operation of said means for manually adjusting said rings resulting in movement of said lever differential means.

10. A photographic camera including an optical axis and a shutter adjusting ring mounted for rotation about said optical axis as a center, said ring having gear teeth thereon, a shaft parallel to and offset from said optical axis, a pinion mounted on said shaft and meshing with said gear teeth, an exposure meter follow-up pointer operatively connected to said shaft to be moved by rotation of said shaft, an adjusting knob mounted on said shaft in a position accessible for manual actuation, a rotationally fixed connection between said knob and said pinion, and a rotationally adjustable driving connection between said knob and said shaft.

11. A construction as defined in claim 10, in which said fixed connection comprises a plurality of rod members offset from said shaft and connecting said knob to said pinion in non-rotatable relation to each other, and in which said adjustable driving connection comprises a clutch jaw member non-rotatably mounted on said shaft for axial movement thereon, said clutch jaw member having a part interengaging with said knob in any one of a plurality of positions of orientation with respect thereto.

12. A photographic camera including a built-in photoelectrically operated exposure value meter having a pointer, said camera having a picture-taking lens axis, a shutter speed and a diaphragm aperture adjusting ring each mounted for rotary movement about said lens axis, means for manually adjusting each of said rings, a pair of axially extending shafts each coupled to one of said rings, a follow-up pointer arranged to be moved into alinement with said meter pointer, lever differential means coupled to said follow-up pointer for determining the exposure value indicating position thereof, and drive means for operatively connecting said shafts and lever differential means and arranged so that said follow-up pointer indicates a constant exposure value when said shafts are turned an equal angular amount in the same direction and indicates a changed exposure value when said shafts are turned relative to one another.

References Cited in the file of this patent

UNITED STATES PATENTS

| | | |
|---|---|---|
| 2,467,946 | Rossmann | Apr. 19, 1949 |
| 2,576,813 | Simons | Nov. 27, 1951 |
| 2,879,702 | Gossen | Mar. 31, 1959 |
| 2,887,026 | Rentschler | May 19, 1959 |